United States Patent Office 3,283,026
Patented Nov. 1, 1966

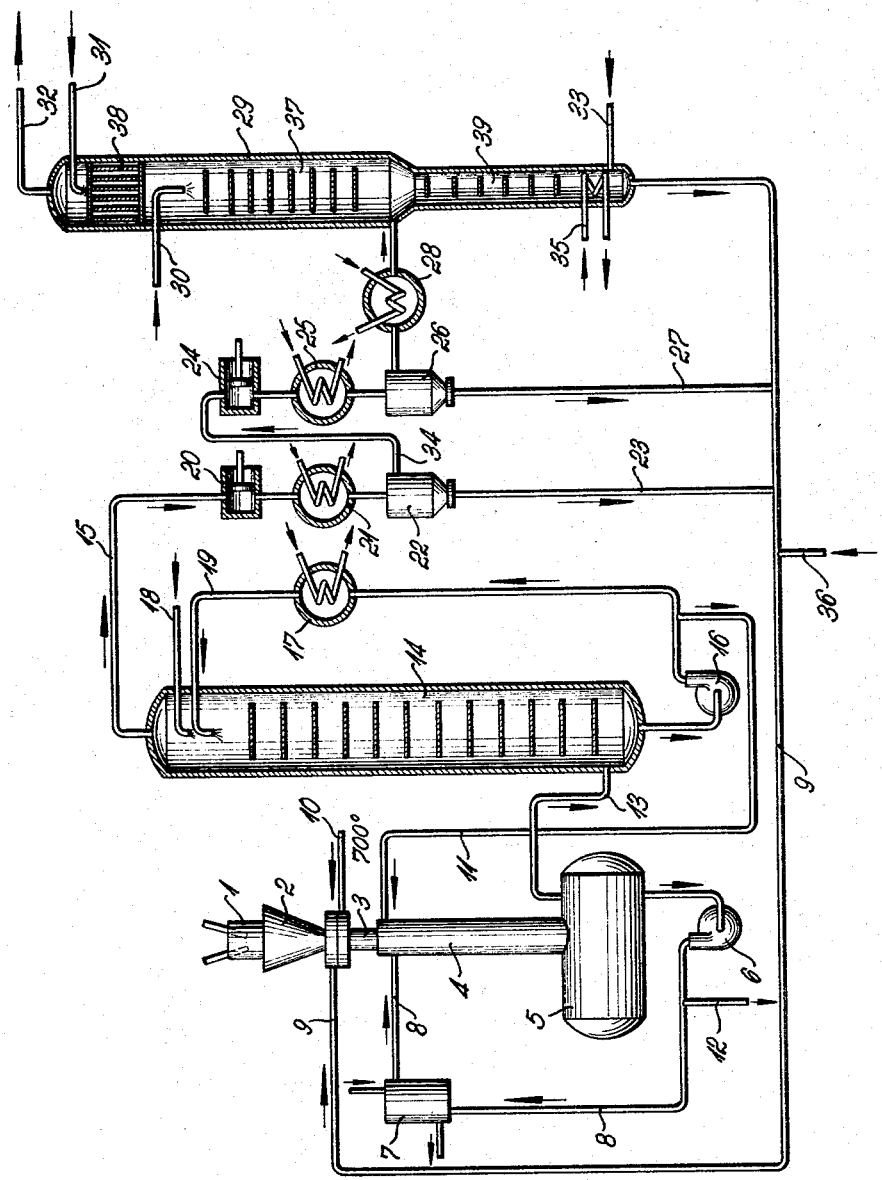

3,283,026
PURIFICATION OF CRUDE GAS OBTAINED BY THERMAL ARC SPLITTING OF HYDROCARBONS
Joachim Kandler, Knapsack, near Cologne, Gunter Legutke, Bruhl, near Cologne, Franz Pohl, Leverkusen-Wustenhof, Erich Schallus, Cologne, and Kurt Sennewald and Lothar Strie, Knapsack, near Cologne, Germany, assignors to Knapsack Aktiengesellschaft, a corporation of Germany
Filed Dec. 24, 1963, Ser. No. 333,216
Claims priority, application Germany, Dec. 29, 1962, K 48,600
15 Claims. (Cl. 260—679)

The present invention is concerned with a process for purifying the crude gas mixture obtained by the thermal arc splitting of hydrocarbons under hydrogen by separating cleavage products having more than 2 carbon atoms therefrom.

It is known that hydrocarbons can be split by thermal means, for example by allowing hot gases to act thereon or by partial combustion of the hydrocarbons themselves or in an electrical arc, the resulting hot cleavage gases initially requiring quenching to recover acetylene and ethylene therefrom. The quenching agents used for removing the thermal enthalpy of the cleavage gases include, for example, water and hydrocarbons having a certain boiling range.

It has also been suggested that in the thermal splitting of hydrocarbons in hydrogen heated to high temperatures in the electrical arc a portion of the thermal enthalpy of the cleavage gases already cooled down to a temperature of 1200 to 1300° C. be removed by the additional introduction of gasoline evaporated or not into a so-called after-reaction space in which the gasoline is split into olefins having 2 to 4 carbon atoms, the cleavage gases being cooled thereby at a temperature of about 700–800° C. The cleavage gases may then be further quenched with water. Water as the quenching agent involves the disadvantage that the oils, tars and polymers formed during the cleavage reaction are separated from the quenching agent as insolubles to produce undesired deposits in the quenching chamber, and cloggings in the cooling water cycles of the successive cooling stages. Water also involves the disadvantage that a cleavage gas anhydrous in itself is subsequently charged with steam and must then be dried before the purified gas is separated, for example in an intense cooling means.

Hydrocarbons may also be used as the quenching agent and proposals have already been made to use an excess thereof in order to remove the thermal enthalpy contained in the cleavage gas, the quenching agent being merely heated at temperatures below its boiling point. Since in this method of working the oils, tars and polymers formed during the cleavage process are dissolved in the quenching agent, the latter requires constant replenishment to maintain a certain solidifying point, resulting in heavy demands of hydrocarbons. Furthermore, undesired tarry deposits will form in the series-connected cooling means which can merely be removed by interrupting the processing treatment to which the crude gas is subjected.

Acetylene can also be separated from quenched cleavage gas by methods wherein the acetylene is removed from the gas by washing with a solvent, such as acetone, γ-butyrol acetone, dimethylformamide and the like, if desired with the application of pressure in order to dissolve rather substantial amounts of acetylene in the solvent. The higher acetylene byproducts obtained by the thermal splitting of hydrocarbons, especially diacetylene, triacetylene, vinylacetylene and methylacetylene have proved very disturbing in these processes for the reason that they readily polymerize in the compressed gas and thus give rise to obstruction before and after the compressors in the compression stages themselves as well as in the series connected apparatus parts. Proposals have therefore been made to remove such higher acetylenes after the compression stages by washing with rather small amounts of a wash agent, which is preferably the same as that used for dissolving the acetylene. These steps did not, however, result in the complete suppression of polymer soiling at the above places. According to a still further proposal the higher acetylenes are separated with the aid of a solvent as early as before the gas compression step, but this requires large amounts of solvent, the subsequent processing treatment of which is expensive and disadvantageous to the economy of this process.

Still further, it is known that higher hydrocarbons, especially those having at least 3 carbon atoms, for example paraffins, olefins, benzenes and higher acetylenes can be separated from acetylene- and/or ethylene-containing crude gas mixtures as obtained by pyrolytical splitting of liquid hydrocarbons. To this end, the cleavage gas mixture is washed, at temperatures of about −60 to −80° C. and under pressures of about 10 to 20 atmospheres absolute, with a portion of the liquid hydrocarbon to be split, whereas the bulk thereof is first evaporated and superheated at a temperature of 400 to 500° C. and then subjected at atmospheric pressure to the cleavage process, the superheated hydrocarbon before entering into the cleavage process being combined with the wash liquid preheated to a temperature below its boiling point and contaminated with the higher hydrocarbons.

The present invention provides a process for purifying an acetylene- and ethylene-containing crude gas mixture resulting from the pyrolyzing of hydrocarbons with hydrogen heated at high temperatures in the electrical arc by separating cleavage products having more than 2 carbon atoms, tarry and soot-like constituents therefrom, wherein in a first stage, the hot crude gas mixture is quenched with a thermally stable quenching oil at a temperature of between about 150 and 250° C., preferably 180 and 200° C., the oil used for quenching and for providing heat exchange being employed in an excess such that it merely undergoes partial evaporation, and wherein, in a second stage, the mixture consisting of evaporated quenching oil and quenched crude gas is cooled with a precooled wash oil conducted countercurrently to the said mixture and cycled within said second stage until the oil portion of the mixture is substantially condensed, and wherein the crude gas substantially freed from the quenching oil is compressed under a pressure of about 10 to about 20 atmospheres absolute, precooled at a temperature within the range of about −30 to −50° C. and then supplied to a third stage, in which higher boiling cleavage products having more than two carbon atoms are removed from the crude gas by washing it in countercurrent manner with feed hydrocarbon precooled at a temperature of about −60 to −80° C. and having a boiling point of at least 35° C.

According to a further embodiment of the present invention the feed hydrocarbons subjected to pyrolysis are preferably those which boil within a temperature range of between about 35 to 200° C., and the agents used for quenching and washing the crude gas mixture include, for example, paraffinic hydrocarbons having a boiling range of between about 200 to about 380° C., fuel oils or diesel oils and the like. The hot crude gases are quenched using the oil in an excess sufficient to ensure that the crude gas leaves the quenching chamber at a temperature of preferably 180 to 200° C. The proportion of oil required for quenching depends substantially on its evaporation heat, which is greater than the corresponding specific heat, so that the proportion of oil required for quenching in the present process is substantially inferior to that required in conventional processes. The oils, tars, polymers and soot which are formed during the quenching of the hot crude gas, are already separated in the quenching chamber with the result that contamination of the wash- or coolant cycle in the successive condensing stage and thus permanent replenishment of the cycle oil are obviated.

The proportion of quenching oil not evaporated on quenching the crude gas is continuously withdrawn from the first stage together with constituents already condensed, such as tars, polymers and soot, first cooled in a heat exchanger at a temperature of about 150 to 180° C. and then again recycled into the first stage for quenching the hot crude gases. The calorific energy of the oil not evaporated can be utilized in the heat exchanger, preferably for the generation of steam. The soot obtained in addition to the crude gas by pyrolyzing hydrocarbons in the hydrogen-arc is especially fine and the cycled quenching oil may therefore be allowed to contain about 20 to 30% by weight soot, without the soot-charged oil being required to be previously replenished. When the proportion of soot in the quenching oil amounts to about 20 to 30% by weight, a portion of quenching oil is removed from the quenching oil cycle and replaced with fresh oil. The proportion of quenching oil removed may either be purified and then supplied again as fresh oil or may be burnt.

The process of the present invention is more particularly carried out as follows: the mixture of crude gas and evaporated quenching oil removed from the first stage is cooled in a second stage at a temperature of about 20 to 30° C., the crude gas being cooled with the aid of a precooled and cycled wash oil. The crude gas may be cooled in one or more series-connected condensers, the evaporated quenching oil entrained by the crude gas being substantially condensed. In order to maintain the proportion of wash oil cycled in the second stage at a constant level, a proportion of wash oil corresponding to the proportion of condensed oil is permanently removed from the oil cycle and introduced into the first stage for quenching the crude gas. In addition to its being cooled, the crude gas is simultaneously further purified in the second stage by separation of oil and tar mists and residual soot and polymers. Due to the pre-purification step to which the crude gas mixture is subjected in the quenching chamber of the first stage, the oil cycled through the condenser of the second stage remains so pure that the cooler inserted in the oil cycle is no longer soiled.

In the second stage, the unsplit constituents of the hydrocarbons to undergo thermal splitting, for example gasoline or benzene, are also absorbed by cycled wash oil and returned together with the wash oil into the quenching chamber where they evaporate again. These constituents of the feed hydrocarbons gradually accumulate to such an extent that they are no longer completely absorbed in the second stage and partially penetrate with the crude gas into the following compression stages.

However, the crude gas coming from the second stage is prepurified to such an extent that it can be compressed under a pressure of about 10 to 20 atmospheres absolute without difficulty. The gas is compressed stagewise, preferably in two compression stages, the compression heat evolved on compressing the gas being dissipated by indirect gas cooling. The condensates obtained during the cooling step which include unchanged feed hydrocarbon and liquid olefins having more than 4 carbon atoms are recycled to undergo thermal splitting in the hydrogen arc.

In order to further free the compressed crude gas from all cleavage products having more than two carbon atoms, such as methylacetylene, monovinylacetylene, diacetylene, propylene and butylene and from feed hydrocarbon proportions not completely removed on compressing the crude gas, the gas is first precooled at about −30 to −50° C. and then washed out in a third stage with the feed hydrocarbon to be split, conducted counter-currently to the crude gas. The washing is more particularly carried out as follows: a cooling or condensing zone produced, for example, by evaporating liquid ethylene is maintained at a location above the third stage inlet opening for the feed hydrocarbon pre-cooled at about −60 to −80° C. and serving as the wash oil. In that zone, considerable amounts of acetylene and/or ethylene are condensed which are returned together with the wash oil into the absorption zone below the condensing zone. This has the effect that higher-boiling impurities having more than 2 carbon atoms are completely separated from the acetylene- and/or ethylene-containing crude gas supplied at a location below that absorption zone. In the condensing zone, about 10 to about 30% of the acetylene and/or ethylene contained in the crude gas feed are condensed. The acetylene and/or ethylene dissolved in the contaminated wash oil is evaporated at a temperature of about −40° C. in an expelling zone disposed below the crude gas intake, and expelled from the wash oil by the simultaneous introduction of an inert gas. The inert gas may be, for example, hydrogen or the residual gas remaining after separation of the acetylene and ethylene from the pyrolyzed gas, the residual gas containing, for example, hydrogen and methane. The wash oil charged with higher hydrocarbons and obtained in the expelling zone is returned to undergo thermal splitting in the hydrogen arc.

The process of the present invention offers the advantage that oxygen-free cleavage gases can be quenched to remain free of oxygen and in addition thereto that steam-free cleavage gases can be treated to remain free of steam so that complicated and expensive drying of the gases is avoided.

Applied to the purification of steam-containing gases, in which the steam may be formed during the cleavage reaction or by combustion of a fuel oil, for example hydrogen, the thermal enthalpy of the hot crude gas is removed likewise by evaporating oil in a manner analogous to the removal thereof in steam-free gases. Alternatively, a portion of the thermal enthalpy of a steam-containing or initially steam-free cleavage gas may be removed in conventional manner by evaporating water and the crude gas further cooled in a second step by evaporating oil. The steam-containing, quenched crude gas is then cooled in the following condensing stage, the steam being condensed at a temperature of about +30° C. As a result of the considerable difference in density and the low viscosity of the oil which continues condensing at that temperature, the water can readily be separated from the oil which is necessary.

Furthermore, the process of the present invention offers the considerable advantage that a single solvent, preferably a thermally stable liquid hydrocarbon, is used in all processing steps comprising quenching, further cooling and washing of the cleavage gas and absorption of the polymers formed, the solvent being preferably cycled in all processing stages.

Finally, the steps taken in the first stage for quenching the hot crude gas add to the economy of the present process, wherein a portion of the quenching oil is evaporated for removing the enthalpy of the gas with the result that the amount of oil required is considerably diminished as compared with the amounts necessary in the conventional methods.

The process of the present invention can be carried out, for example, as shown in the flow scheme represented in the accompanying drawing, wherein the numerals designate the following parts: 1 is a combustion chamber in which hydrogen is arc heated at an average temperature of about 3500° C. The high temperature hydrogen is used in reaction chamber 2 for thermally splitting feed hydrocarbons previously evaporated and introduced into the reaction chamber 2 through conduit 9. The resulting gaseous cleavage products are caused to travel at a temperature of about 1200 to 1300° C. into the after-reaction chamber 3 in which they are cooled at a temperature of about 700° C. by supplying a further amount of feed hydrocarbons through conduit 10, with the resultant formation of olefins having substantially 2 to 4 carbon atoms. The crude gas is still further cooled in quenching chamber 4 supplied through conduits 8 and 11 with an amount of quenching oil sufficient to ensure that the crude gas is quenched at a temperature of between about 150 to 250° C., with partial evaporation of the quenching oil; the not evaporated portion thereof is initially collected together with tarry condensates and soot in separator 5. Paraffinic hydrocarbons having a boiling range of about 200 to 380° C. may be used as the quenching oil. The portion of the hot quenching oil not evaporated and collected in separator 5 is conveyed through line 8 and with the aid of pump 6 to heat exchanger 7, cooled therein with generation of heat at a temperature of between about 150 to 180° C. and ultimately introduced again into the quenching chamber 4.

The cycled quenching oil may contain up to 30% by weight accumulated soot without cloggings in the heat exchanger 7 or pump 6 being liable to occur. As soon as a maximum soot content of 30% by weight is reached in the quenching oil, the soot-charged quenching oil is partially removed from the quenching oil cycle through line 12 and a corresponding amount of fresh oil is replenished which is supplied to the quenching chamber 4 through line 18, the condensation tower 14 and line 11.

The hot crude gas having a temperature of about 200° C. travels jointly with the evaporated portion of the quenching oil through line 13 to condensing tower 14, in which it is further cooled down to a temperature of about 20 to 30° C. by being sprinkled with wash oil cycled through line 19 with the aid of pump 16. The wash oil is cooled by means of the cooler 17 inserted into the wash oil cycle. The crude gas removed from the condensing tower 14 through line 15 is compressed stagewise in compressors 20 and 24 at a pressure of about 10 to 20 atmospheres absolute, the resulting condensates being initially collected in separators 22 and 26 and then returned through lines 23 and 27 and line 9 into reaction chamber 2 to undergo thermal splitting therein. The crude gas heated by compression is precooled in coolers 21 and 25, further cooled in cooler 28 at about −30 to −50° C. and then introduced through lines 34 and 26 into wash column 9 in which it is washed in counter-current manner with feed hydrocarbon having a temperature of about −60 to −80° C. supplied through line 30. To intensify the wash effect produced in the absorbing zone 37, a condensing zone 38 produced by evaporating liquid ethylene is maintained at a location above the inlet opening for the feed hydrocarbon into the wash column 29. In the condensing zone 38, considerable amounts of acetylene and/or ethylene are condensed which are returned jointly with the feed hydrocarbon used as the wash oil and thus ensure complete separation of higher-boiling impurities. Liquid ethylene is introduced into condensing zone 38 through line 31. The acetylene and/or ethylene dissolved in the contaminated feed hydrocarbon is evaporated at a temperature of about −40° C. in expelling zone 39 disposed below absorbing zone 37 with the help of heating means 35 and expelled from the feed hydrocarbon by simultaneously introducing an inert gas through line 33. The feed hydrocarbon charged with the contaminants of the crude gas and obtained in expelling zone 39 is conveyed through line 9, while adding fresh feed hydrocarbon through line 36, to arrive in reaction chamber 2 to undergo thermal splitting therein. The purified crude gas is withdrawn at the top portion of wash column 29 through line 27.

*Example 1*

600 normal cubic meters hydrogen (measured at N.T.P.) were heated per hour in an arc having a capacity of 2000 kw. established in combustion chamber 1. The hydrogen coming from combustion chamber 1 and entering into the reaction chamber 2 had an average temperature of 3500° C. and was dissociated into hydrogen atoms to the extent of about 50%. The heated hydrogen was mixed and split within two milliseconds in reaction chamber 2 with 650 kg. gasoline in vapor form having a boiling temperature limit of 150° C., the gasoline vapors being introduced at a temperature of 200° C. through line 9 into reaction chamber 2. The gaseous cleavage products leaving the reaction chamber 2, referred to hereinafter as the crude gas, were composed as follows:

| | Percent by volume |
|---|---|
| Hydrogen | 66.5 |
| Methane | 6.3 |
| Acetylene | 15.4 |
| Ethylene | 6.4 |
| Ethane and higher hydrocarbons, such as feed gasoline, olefins and higher acetylenes | 5.4 |

The crude gas left the reaction chamber 2 at a temperature of about 1250° C. and arrived in after-reaction chamber 3 the walls of which were scavenged with 150 kg. gasoline vapor at about 200° C. supplied through line 10. After a time of stay of about 1 millisecond, the crude gas cooled at about 860° C. left after-reaction chamber 3 and was quenched at about 200° C. in quenching chamber 4 with about 63.5 m.$^3$/h. of a paraffin basic fuel oil distillate boiling within a temperature range of 250 to 380° C., about 60 m.$^3$ of the fuel oil distillate being supplied through line 8 at a temperature of 180° C. and 3.5 m.$^3$ fuel oil being supplied at a temperature of 120 to 125° C. through line 11 to the quenching chamber 4. In separator 5, the quenching oil not evaporated was separated from its evaporated portion and the quenched crude gas, and the liquid hot quenching oil was conveyed with pump 6 and through line 8 to heat exchanger 7, cooled therein at a temperature of 180° C. with the simultaneous evolution of 500 kg. steam per hour. The cooled quenching oil was then reintroduced into the quenching chamber 4. The soot portions obtained on quenching the crude gas were absorbed to the extent of about 30% by weight by the quenching oil not evaporated and were partially removed with the quenching oil through line 12. A corresponding proportion of fresh oil was introduced into the quenching chamber 4 through line 18, condenser 14 and line 11. The quenching oil contaminated with soot was purified by centrifuging.

The quenched crude gas was conveyed together with the evaporated quenching oil from quenching chamber 4 through line 13 to condenser 14 and cooled therein down to about 20 to 25° C. by being sprinkled with cold fuel oil distillate, about 3.5 m.$^3$ quenching oil being condensed. An amount of fuel oil corresponding to the condensate obtained was removed from the coolant cycle 19 and returned through line 11 into the quenching chamber 4. The crude gas withdrawn at the top portion of condenser 14 was composed as follows:

| | Percent by volume |
|---|---|
| Hydrogen | 60.0 |
| Methane | 8.2 |
| Acetylene | 14.9 |
| Ethylene | 11.4 |
| Ethane and higher hydrocarbons | 5.5 |

1430 normal cubic metres (measured at N.T.P.) crude gas were removed per hour from condenser 14, the crude gas containing acetylene and ethylene in the ratio of 55:45% by weight.

The crude gas prepurified in condensing tower 14 was compressed stagewise in compression stages 20 and 24 at 16 atmospheres absolute, the compression heat evolved being discharged into cooler 21 and cooler 25. The liquid hydrocarbons obtained on compression, for example proportions of the feed gasoline, were collected in separators 22 and 26 and supplied through line 23 and line 27 or line 9 to reaction chamber 2. The compressed crude gas was indirectly cooled in cooler 28 with liquid ammonia at −45° C. and washed in counter-current manner in wash column 29 with about 250 kg. gasoline, previously cooled at −60° C. To intensify the wash effect, liquid acetylene was supplied through line 31 so that the temperature of the acetylene-and ethylene-containing off-gas amounted to −65 to −75° C. The acetylene and ethylene dissolved in the wash gasoline was evaporated in expelling zone 39 at a temperature of −40° C. and expelled by introducing an additional amount of hydrogen, 1354 normal cubic metres (measured at N.T.P.) purified gas composed as follows were removed at the top portion of the wash column 29, the liquid ethylene being disregarded:

| | Percent by volume |
|---|---|
| Hydrogen | 63.4 |
| Methane | 8.9 |
| Acetylene | 15.7 |
| Ethylene | 12.0 |

The gasoline used for washing the crude gas and removed from the wash column 29 through line 9 was admixed through line 36 with such a proportion of fresh gasoline sufficient to ensure that 650 kg. gasoline were supplied per hour to the reaction space 2 for thermal splitting.

We claim:

1. A process for purifying an acetylene and ethylene-containing crude gas mixture as obtained by pyrolysing hydrocarbons with hydrogen heated to high temperatures in an electrical arc by separating cleavage products having more than two carbon atoms, tarry and soot-like constituents therefrom, which comprises quenching the hot crude gas mixture in a first stage with a thermally stable quenching oil at a temperature of between about 150 to 250° C., the quenching oil which provides for heat exchange being employed in an excess proportion such that it is merely partially evaporated, cooling the resulting mixture consisting of evaporated quenching oil and quenched crude gas in a second stage with a precooled wash oil conducted countercurrently to the said mixture and cycled within said second stage until the oil portion of the mixture is substantially condensed, compressing the crude gas substantially freed from quenching oil under a pressure within the range of about 10 to 20 atmospheres absolute, precooling the compressed crude gas at a temperature within the range of about −30 to −50° C. and supplying it to a third stage, wherein higher boiling cleavage products having more than two carbon atoms are removed from the crude gas by washing it countercurrently with feed hydrocarbon precooled at a temperature of about −60 to −80° C. and having a boiling point of at least 35° C.

2. A process as claimed in claim 1, wherein the hot crude gas mixture is quenched in the first stage at a temperature within the range of about 180 to 200° C.

3. A process as claimed in claim 1, wherein paraffinic hydrocarbons having a boiling range of about 200 to 380° C. are used for quenching the crude gas mixture in the first stage and for washing it in the second stage.

4. A process as claimed in claim 1, wherein the portion of the hot quenching oil not evaporated and charged with tars, polymers and soot is permanently removed from the first stage, cooled at a temperature of about 150 to 180° C. and then recycled to the first stage for quenching the crude gas.

5. A process as claimed in claim 4, wherein the cycled quenching oil is partially removed from the cycle when its soot content is about 20 to 30% by weight and replaced with a corresponding amount of fresh oil.

6. A process as claimed in claim 1, wherein the mixture of crude gas and evaporated quenching oil is cooled in the second stage at a temperature of about 20 to 30° C. and a proportion of wash oil corresponding to the proportion of condensed oil is removed from the precooled wash oil cycle and introduced into the first stage for quenching the crude gas.

7. A process as claimed in claim 1, wherein the crude gas withdrawn from the second stage is compressed stagewise.

8. A process as claimed in claim 7, wherein the crude gas is compressed in two stages.

9. A process as claimed in claim 7, wherein the condensed matter obtained on compressing the crude gas is introduced into the hydrogen arc for thermal splitting.

10. A process as claimed in claim 1, wherein a cooling and condensing zone is maintained at a location above the inlet opening for the feed hydrocarbon into the third stage, in which condensing zone considerable amounts of a member selected from the group consisting of acetylene and ethylene are condensed, which are returned together with the feed hydrocarbon into the absorption zone below the condensing zone resulting in the complete separation of high-boiling impurities having more than 2 carbon atoms from the acetylene and ethylene containing crude gas supplied at a position below said absorption zone.

11. A process as claimed in claim 10, wherein the cooling and condensing zone is produced by evaporating liquid ethylene.

12. A process as claimed in claim 10, wherein between about 10 and 30% of the gas consisting of a member selected from the group consisting of acetylene and ethylene contained in the crude gas supplied are condensed in the condensing zone.

13. A process as claimed in claim 1, wherein the gas consisting of a member selected from the group consisting of acetylene and ethylene and dissolved in the contaminated feed hydrocarbon is evaporated at a temperature of about −40° C. in an expelling zone formed below the crude gas intake and expelled from the feed hydrocarbon serving as the wash oil by simultaneously introducing an inert gas.

14. A process as claimed in claim 1, wherein the contaminated feed hydrocarbon obtained in the third stage is thermally split in the hydrogen arc.

15. A process as claimed in claim 1, wherein the feed hydrocarbons have a boiling range of between about 35 to 200° C.

References Cited by the Examiner

UNITED STATES PATENTS

| 2,982,794 | 5/1961 | Davison | 260—679 |
| 3,022,148 | 2/1962 | James | 260—679 |
| 3,060,247 | 10/1962 | Wolfram | 260—679 |
| 3,236,905 | 2/1966 | Otsuka et al. | 260—679 |
| 3,236,906 | 2/1966 | Margiloff | 260—679 |

ALPHONSO D. SULLIVAN, *Primary Examiner.*